United States Patent
Major et al.

(10) Patent No.: US 8,751,085 B2
(45) Date of Patent: Jun. 10, 2014

(54) METHOD AND SYSTEM FOR BATTERY CHARGING AND THERMAL MANAGEMENT CONTROL IN ELECTRIFIED VEHICLES

(75) Inventors: Gregory Major, Farmington Hills, MI (US); Mark Utter, Rochester Hills, MI (US); Jian Cao, Santa Monica, CA (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/566,064

(22) Filed: Aug. 3, 2012

(65) Prior Publication Data

US 2014/0039735 A1 Feb. 6, 2014

(51) Int. Cl.
*B60K 6/04* (2006.01)
*B60L 11/18* (2006.01)

(52) U.S. Cl.
USPC .............................................. 701/22; 320/109

(58) Field of Classification Search
USPC .......................... 701/22, 1; 320/109, 128, 134
See application file for complete search history.

(56) References Cited

U.S. PATENT DOCUMENTS

| | | | | |
|---|---|---|---|---|
| 5,686,812 | A | * | 11/1997 | Hotta ............................ 320/134 |
| 2011/0046828 | A1 | | 2/2011 | Chander et al. |
| 2011/0118919 | A1 | | 5/2011 | Park et al. |
| 2011/0191220 | A1 | * | 8/2011 | Kidston et al. ................... 705/34 |
| 2011/0208382 | A1 | * | 8/2011 | Uchida ........................... 701/22 |
| 2011/0210698 | A1 | * | 9/2011 | Sakai ............................. 320/109 |
| 2012/0041855 | A1 | * | 2/2012 | Sterling et al. ................... 705/34 |
| 2013/0096734 | A1 | * | 4/2013 | Tonegawa et al. ................ 701/2 |
| 2013/0162027 | A1 | * | 6/2013 | Yamamoto et al. ............ 307/9.1 |

FOREIGN PATENT DOCUMENTS

| | | |
|---|---|---|
| WO | 2010/100081 A2 | 9/2010 |
| WO | 2011/126909 A2 | 10/2011 |
| WO | 2012/095128 A2 | 7/2012 |

OTHER PUBLICATIONS

International Search Report and Written Opinion dated Mar. 12, 2014 for International Application No. PCT/US2013/047571, International Filing Date Jun. 25, 2013.

* cited by examiner

*Primary Examiner* — Tan Q Nguyen
(74) *Attorney, Agent, or Firm* — Ralph E. Smith

(57) ABSTRACT

A method and a control system for charging a battery in a plug-in hybrid or all electric vehicle, thermally conditioning the battery, and/or thermally conditioning the passenger compartment of the plug-in hybrid or all-electric vehicle. Multiple variables may be used in order to determine the optimal timing of conducting the charging and thermal conditioning processes including time required to complete the processes, energy costs, and user set preferences.

19 Claims, 5 Drawing Sheets

METHOD AND SYSTEM FOR BATTERY CHARGING AND THERMAL MANAGEMENT CONTROL IN ELECTRIFIED VEHICLES

TECHNICAL FIELD

The present disclosure relates to electric vehicles. Specifically, the disclosure relates to battery charging of electrified vehicles, thermal management of the battery, and thermal management of the vehicle cabin.

BACKGROUND

Charging systems for batteries in electric vehicles, in one known form, provide a constant charge level when the electric vehicle is connected to the charging system. The charging system begins to charge the battery and then ceases charging once the battery is fully charged. The battery charging rate changes depending on the level of charge currently stored in the battery. An empty battery charges at a faster rate than one that is fuller. These known charging systems, however, do not account for the current charge level remaining on the battery, the thermal state of the battery, or external factors such as when the electric vehicle may be used again. Applying constant charge can be both cost and energy inefficient and detrimental to the durability and longevity of the battery.

In addition, a battery operates more efficiently and effectively at a temperature of approximately 75° Fahrenheit. If the temperature of the battery, due to ambient temperature or other factors, is very cold, then the battery outputs less power. On the other hand, high battery temperature reduces the lifetime of the battery. Also, by charging immediately upon being plugged in, the battery is unable to take advantage of a less expensive electrical utility rate available, for instance, late at night or very early in the morning.

Currently, when a driver resumes use of a vehicle after an extended time, the vehicle passenger compartment, also known as the cabin, will have a temperature equalized with its surroundings. As a result, when resuming vehicle use, the passenger compartment will be undesirably hot or cold if the ambient temperature is likewise hot or cold. Accordingly, further improvement in the art is desirable.

BRIEF SUMMARY

In one form, the present disclosure provides a control system for operating the battery charging system, the battery thermal conditioning system, and/or the vehicle cabin conditioning system in a plug-in hybrid or electrical vehicle. By providing a feedback control process in accordance with the disclosed embodiments, the battery charging can be performed in such a manner to quickly and efficiently charge the battery while maximizing batter power and battery life-expectancy but minimizing cost.

The present disclosure also provides a control system, which implements a strategy for the charging of electric vehicles and provides an input system to input various variables that will affect the operations of a control unit that in turn controls one or more of the battery charging system, the battery thermal conditioning system, and/or the vehicle cabin conditioning system.

In another form, the present disclosure also provides a method of charging a battery including calculating an amount of time until a drive time that has been preset by the driver or another source, calculating an amount of time required to charge the battery, determining a time to start charging the battery based on the two calculated amounts, and beginning to charge the battery at that time. The method may also provide for thermal conditioning of the battery and/or thermal conditioning of the vehicle cabin.

In another form, the charging system may be utilized to thermally manage the battery in order to maximize battery life and power.

In yet another form, the charging system incorporates inputs from the vehicle user, the battery system, external factors, or all three to thermally manage and charge the battery.

In yet another form, the method allows the vehicle user to heat or cool the vehicle prior to entry into the vehicle.

In another form, the present disclosure provides for a cost efficient charging strategy of the battery system.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
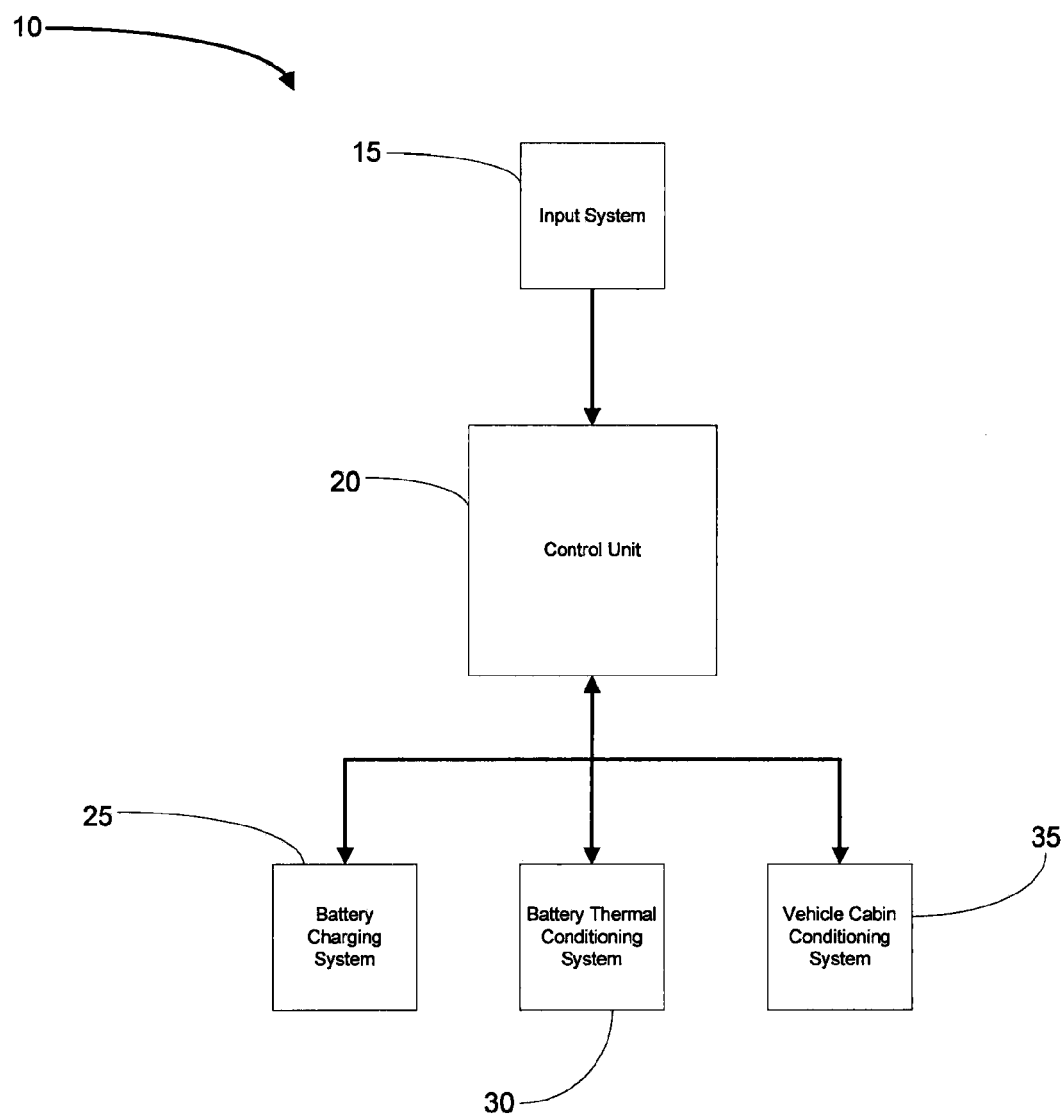
FIG. 1 is a control system for charging a battery in accordance with a disclosed embodiment.

FIG. 1 shows a control system 10 for charging a battery according to a disclosed embodiment. In one embodiment, the control system 10 could be incorporated into a stand-alone charging device or a charging device incorporated with the electrical system of a home or other charging location. In another embodiment, some or all components of the control system 10 are incorporated into the vehicle itself. The charging device could then be connected into a vehicle's on-board control and electrical systems, among other systems. The control system 10 could thereby provide commands to the vehicle's on-board systems and supply charge to the vehicle's battery. The control system 10 provides an input system 15 to allow a user to input preset conditions such as the desired time the user intends to use the vehicle next, referred to as the drive time (DT), and the desired cabin temperature to which the user wishes the vehicle to be at when resuming use. The input system 15 also allows for external factors to be input into the control system 10 such as, e.g., the times of reduced electrical utility rates, a weather or temperature forecast for some duration of time in the future, and present ambient temperature. These factors may be input by the user or may be input from a different external source such as a computer network or ambient sensors (not shown). The input system 15 may be a keyboard, a hard-wired input terminal, a computer application (for example a smartphone application or an internet-based utility), or other similar devices or applications.

The system 10 also includes a control unit 20, a battery charging system 25, a battery thermal conditioning system 30, and a vehicle cabin conditioning system 35. Based on the user and external inputs, the control unit 20 controls a battery charging system 25, which provides charge to the batteries of the vehicle, the battery thermal conditioning system 30, which manages the temperature of the battery, and the vehicle cabin conditioning system 35, which manages the temperature of the vehicle cabin according to the various disclosed embodiments. The control unit 20 may be a processor and may contain memory for storing computer instructions for carrying out the various functions performed by the control unit 20. In one embodiment, the control unit 20 also maintains an internal clock to enable the control unit 20 to calculate durations of time between a time a calculation is performed and times input by the input system 15 for various actions. This internal clock may be set by the input system, may be externally supplied (e.g. by a satellite), or may be maintained internally.

The battery charging system 25 is configured to provide charge to the vehicle battery and balance the charge among the cells of the battery. The battery charging system 25 also provides feedback to the control unit 20 to notify the control unit 20 of the status of the charging and/or balancing of the battery.

The battery thermal conditioning system 30 acts to increase or decrease the temperature of the battery as required to either maintain the battery within a preset tolerance of the optimal battery temperature, or to bring the battery within the tolerance if the battery temperature is beyond the temperature. The battery thermal conditioning system 30 will cool or heat the battery as necessary. In one embodiment, the battery thermal conditioning system 30 is configured to provide feedback to the control unit 20 to notify the control unit 20 of the thermal state of the battery.

The vehicle cabin conditioning system 35 acts to cool or heat the vehicle as desired to bring the cabin temperature to within a preset tolerance of the preset cabin temperature. In one embodiment, the vehicle cabin conditioning system 35 is the vehicle's environmental control system. The vehicle cabin conditioning system 35 may also provide feedback to the control unit 20 to notify the control unit 20 of the thermal state of the vehicle cabin if desired. It is contemplated to provide a charging system that can regulate the temperature of the battery and increase cost efficiency in charging, while also providing a comfortable passenger compartment temperature when a user resumes use of the vehicle.

Figure 2A:
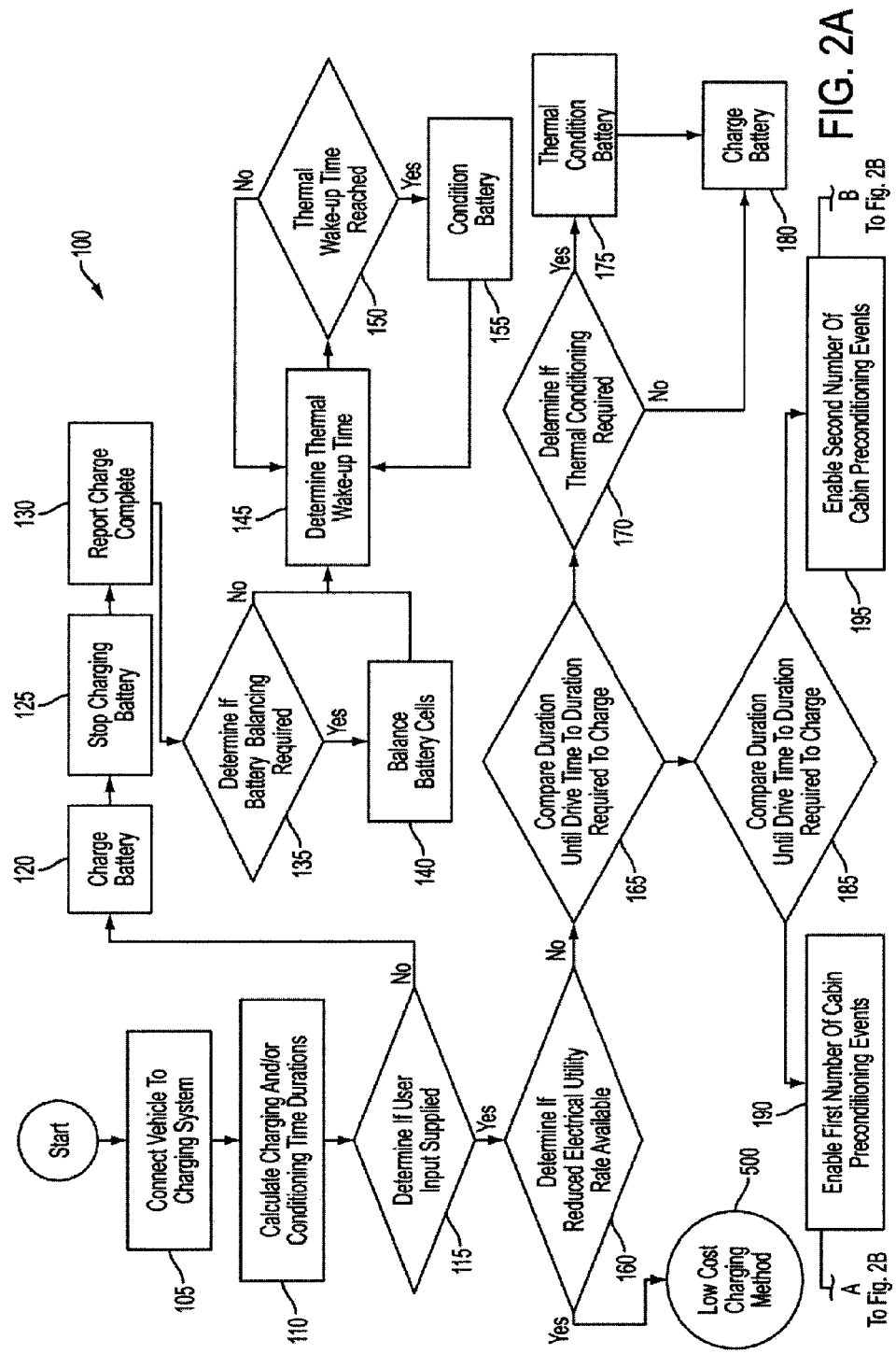
FIGS. 2A and 2B are a flow chart of a charging method in accordance with a disclosed embodiment.
Figure 2B:
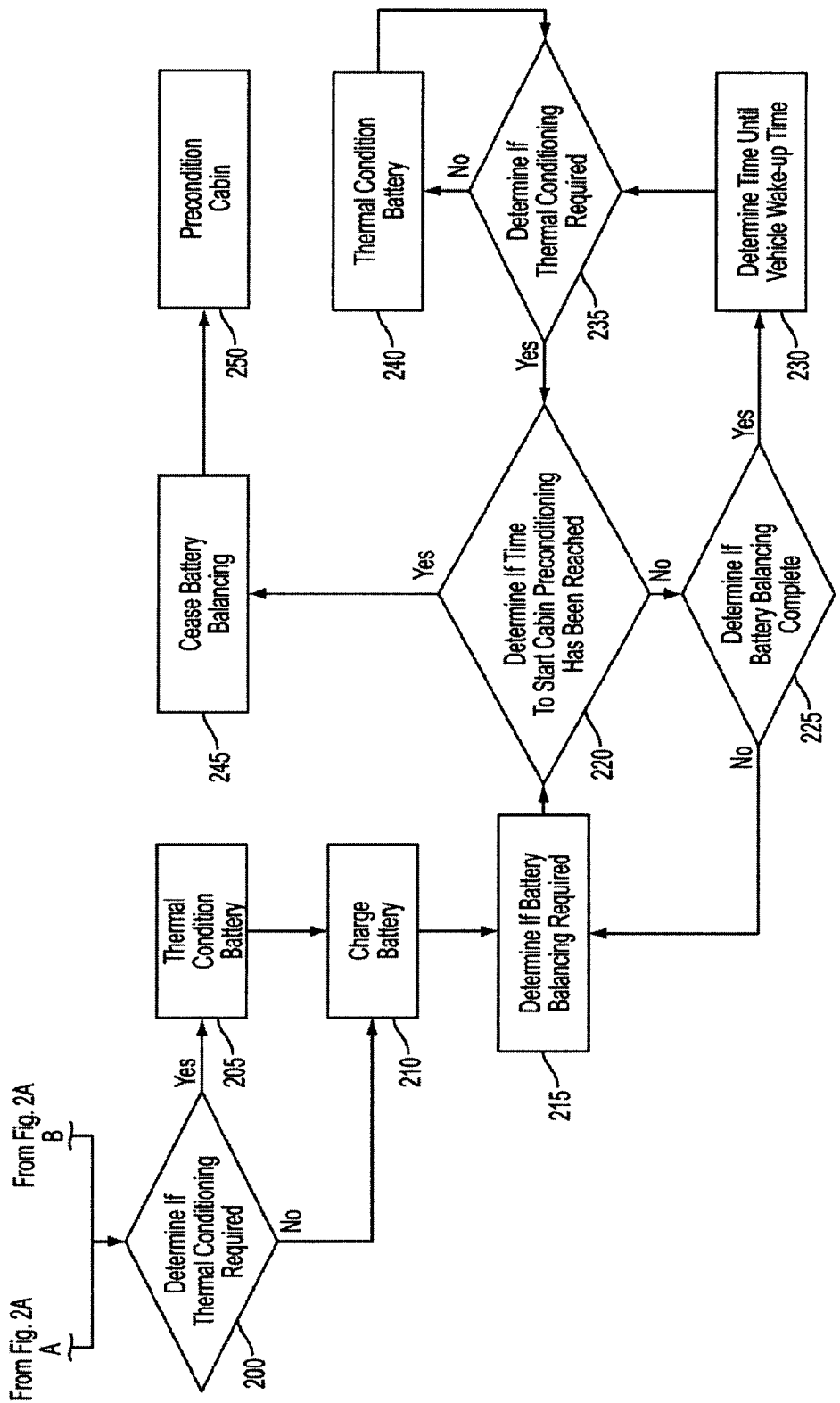

FIGS. 2A and 2B show a method 100 for charging a battery and managing the temperature of the battery and cabin for a plug-in hybrid or all-electric vehicle. The charging system 10 is configured to implement the method 100 whereby the effectiveness of the battery is optimized by monitoring and controlling the charge level of the battery, the thermal condition of the battery (i.e., the battery temperature), and the vehicle cabin temperature. The method 100 may be implemented in software, stored in a computer readable medium (which could be a random access memory (RAM) device, a non-volatile random access memory (NVRAM) device, or a read-only memory (ROM) device), and executed by the control unit 20.

Beginning at step 105, the vehicle's user parks the car and connects the vehicle to a charging system 10 according to a disclosed embodiment. At this time, the user may input into the input system 15, shown in FIG. 1, several factors including, for example, the time at which the user anticipates using the vehicle again and the desired temperature of the vehicle's passenger compartment when resuming use. In a second embodiment, these factors may be pre-programmed into the system.

After the vehicle is parked and connected to the charging system, the system 10 calculates several factors based on the state and condition of the battery at step 110. The system 10 may input a drive time (DT) by either the user or a drive time may be pre-programmed into the charging system 10. The system 10 will determine the duration of time until the preset drive time ($D_{dt}$), the duration of time required to fully charge the battery ($D_c$), the duration of time required to thermally condition the battery to a desired temperature ($D_{tc}$), the duration of time required to balance the charge among the battery cells ($D_{bb}$), and the duration of time required to condition the vehicle passenger compartment to the desired pre-set temperature ($D_{cp}$).

Based on these factors, the system 10 will calculate the time to start charging ($T_{sc}$), time to start thermal conditioning of the battery ($T_{tc}$), and the time to start cabin preconditioning ($T_{cp}$) from the time the user has set to start driving. Depending on the chosen embodiment, any of the charging, battery thermal conditioning, battery balancing, or cabin preconditioning acts can be done concurrently or consecutively. That is to say, $D_c$, $D_{tc}$, $D_{bb}$, and $D_{cp}$ may overlap for some or all of their durations. If any of the events are performed concurrently, the system 10 will draw more power, resulting in increased power consumption. Performing events concurrently can be used to take advantage of reduced electrical utility rates, as will be discussed in further detail below. Performing events concurrently can also enable the vehicle to be ready for use sooner.

In another embodiment, DT may not be set. If DT has not been set or programmed, the system 10 will calculate Dtc, Dbb, and Dcp, but will be unable to calculate Tsc, Ttc, or Tcp. If the Drive Time is not set, then the system will be unable to calculate the time to start charging, because the system doesn't know when charging must be completed. In an embodiment, the system can be configured to begin charging immediately, assuming that the vehicle will need to be available for use as soon as possible.

Next, at step 115, the system 10 determines if the user input a time at which the user anticipates using the vehicle again or if the DT has been pre-programmed. If the user has not input a time or a time has not been pre-programmed, the method 100 continues to step 120. At step 120, the system 10 begins to charge the battery immediately. While charging the battery, the system 10 monitors the thermal condition of the battery. If the battery temperature moves beyond a predetermined tolerance above or below a desired temperature, the charging system 10 reduces the charging power to thermally condition the battery to maintain the battery at or about the desired temperature. In one embodiment, the desired temperature is 75 degrees Fahrenheit. In another embodiment, the charging system 10 maintains the battery temperature at 75° F.+/−5° F. It should be appreciated that the disclosure is not limited to a specific battery temperature.

When the battery is fully charged, the system 10 stops charging the battery (step 125) and reports the charge complete time (step 130). The system 10 then determines whether the battery cells require balancing (step 135) by determining if the charge level of any given cell is outside of a tolerance, either higher or lower than the charge of the other cells. If balancing is required, the system 10 balances the battery cells (step 140) by equalizing the level of charge among the cells of the battery.

At step 145, the system 10 next calculates a thermal wake up time for the vehicle of when the battery temperature goes beyond the temperature tolerance of the battery. When that time is reached (step 150), the system 10 wakes up and confirms if the battery temperature is at the desired temperature. If thermal conditioning is required, the system 10 conditions the battery (step 155) and then recalculates the time for thermal wake-up (step 145). If thermal conditioning is not required, the system 10 recalculates the time for thermal wake-up (step 145). This loop continues until the user resumes use of the vehicle.

If, the system 10 determines at step 115 that DT has been set, the system 10 will determine if a reduced electrical utility rate will be available at step 160. This determination may be based upon several different sources. In one embodiment, the system 10 communicates directly with the utility provider to determine when a reduced electrical utility rate is available. In a second embodiment, the system 10 is programmed with a time range in which a reduced electrical utility rate is available. In another embodiment, the system 10 may be programmed with different tiers of reduced electrical utility rates, to take advantage of the lowest cost charging possible.

If a reduced electrical utility rate is available for some or all of the time overlapping with any of $D_c$, $D_{tc}$, $D_{bb}$, and $D_{cp}$, the method 100 continues at step 500, described in further detail below and with respect to FIGS. 3A and 3B. If a reduced electrical utility rate is not available, the method 100 continues at step 165.

At step 165, the system 10 determines if the $D_{dt}$ is less than or equal to a first set percentage of $D_c$. In one embodiment, this first set percentage is 20% of $D_c$. If the system 10 determines that the $D_{dt}$ is less than or equal to the first set percentage, the method 100 continues at step 170. In a second embodiment, the system 10 determines if the $D_{dt}$ is less than the first set percentage. At step 170, the system 10 determines if the battery requires thermal conditioning. If thermal conditioning is required, the system 10 begins to thermally condition the battery at step 175. In one embodiment, after thermal conditioning is complete, the system 10 begins charging the battery at step 180. In another embodiment, the system 10 conditions and charges the battery at the same time. If battery conditioning is not required, the method 100 proceeds directly from step 170 to step 180 and charges the battery until the user resumes use of the vehicle.

If, at step 165, the system 10 determines that the $D_{dt}$ is greater than the first set percentage of $D_c$, the method 100 proceeds to step 185. At step 185, the system 10 determines if the $D_{dt}$ is less than or equal to a second set percentage of $D_c$. In another embodiment, the system 10 determines if the $D_{dt}$ is less than a second set percentage of $D_c$. In one embodiment, the second set percentage is 35% of $D_c$. If $D_{dt}$ is less than or equal to the second set percentage of $D_c$, the method 100 goes to step 195. If the $D_{dt}$ is not less than or equal to the second set percentage of $D_c$ (i.e. the $D_{dt}$ is greater than the second set percentage of $D_c$), the method 100 goes to step 190. At step 190, the system 10 enables a number cabin preconditioning events or continuous preconditioning. At step 195, the system 10 enables a number of cabin preconditioning events less than the number of cabin preconditioning events at step 190. For example, the system 10 could enable three cabin preconditioning events at step 190, but at step 195, the system 10 could enable one cabin preconditioning event. A cabin preconditioning event is an event for a set duration in which the vehicle either cools or heats the cabin temperature to reach the preset desired cabin temperature. Continuous cabin preconditioning means that the system conditions the cabin until the preset cabin temperature has been reached.

The method 100 then continues at step 200, at which point the system 10 determines if thermal conditioning of the battery is required. If required, the system 10 begins thermally conditioning the battery at step 205. Otherwise, the system 10 begins to charge the battery at step 210. Once thermal conditioning of the battery is completed, the system 10 begins charging the battery at step 210.

In one embodiment, at step 215, the system 10 monitors the battery balance to determine the battery balance. At a time that is the duration of time required for battery balancing before the drive time, the system 10 determines if battery balance is required. If required, the system 10 begins to balance the battery cells.

Next, at step 220, the system 10 determines if the time to start cabin preconditioning ($T_{cp}$) has been reached. This time will depend on the number of cabin preconditioning events enabled at step 190 or step 195. The system 10 will calculate the amount of time required to precondition the cabin to the preset temperature based on the cabin ambient temperature. If the time has not been reached or if an insufficient number of preconditioning events have been enabled, the method 100 continues at step 225 to determine if the battery balance has been completed. If battery balance has not been completed, the method 100 returns to step 215. If the battery balance has been complete, the method 100 proceeds to step 230.

At step 230, the system 10 determines the amount of time remaining until the vehicle wake up time. Vehicle wake up time will depend on the configuration of the charging system 10 including the number of cabin preconditioning events that have been enabled, the temperature of the cabin, the temperature of the battery, and the preset temperature of the cabin.

Next, after calculating the vehicle wake up time, the system 10 determines if the battery is within the preset temperature tolerance of the optimal battery temperature at step 235. If the temperature is not within the temperature tolerance, the method 100 proceeds to step 240 at which point the battery is thermally conditioned until the battery is brought within the temperature tolerance.

The system 10 continues processing this loop until $T_{cp}$ has been reached at step 220. Once the time for cabin preconditioning has been reached, the method 100 proceeds to step 245, at which point the system 10 ceases battery balancing, and then begins cabin preconditioning at step 250. The system 10 preconditions the vehicle until the preset cabin temperature has been reached, the preset number preconditioning events have occurred, or the user begins use of the vehicle.

Figure 3A:
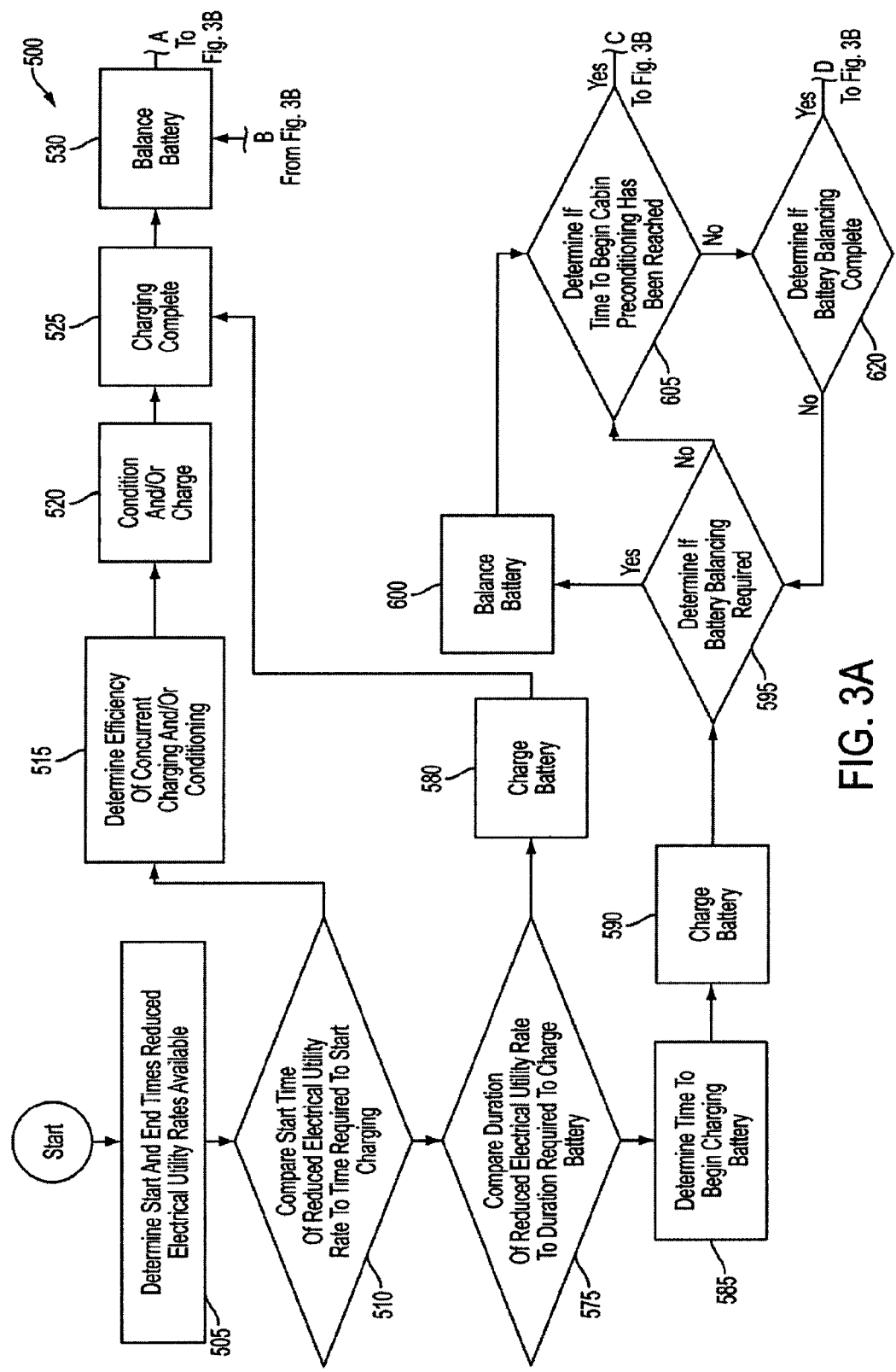
FIGS. 3A and 3B are a flow chart of a charging method in accordance with a second disclosed embodiment.
Figure 3B:
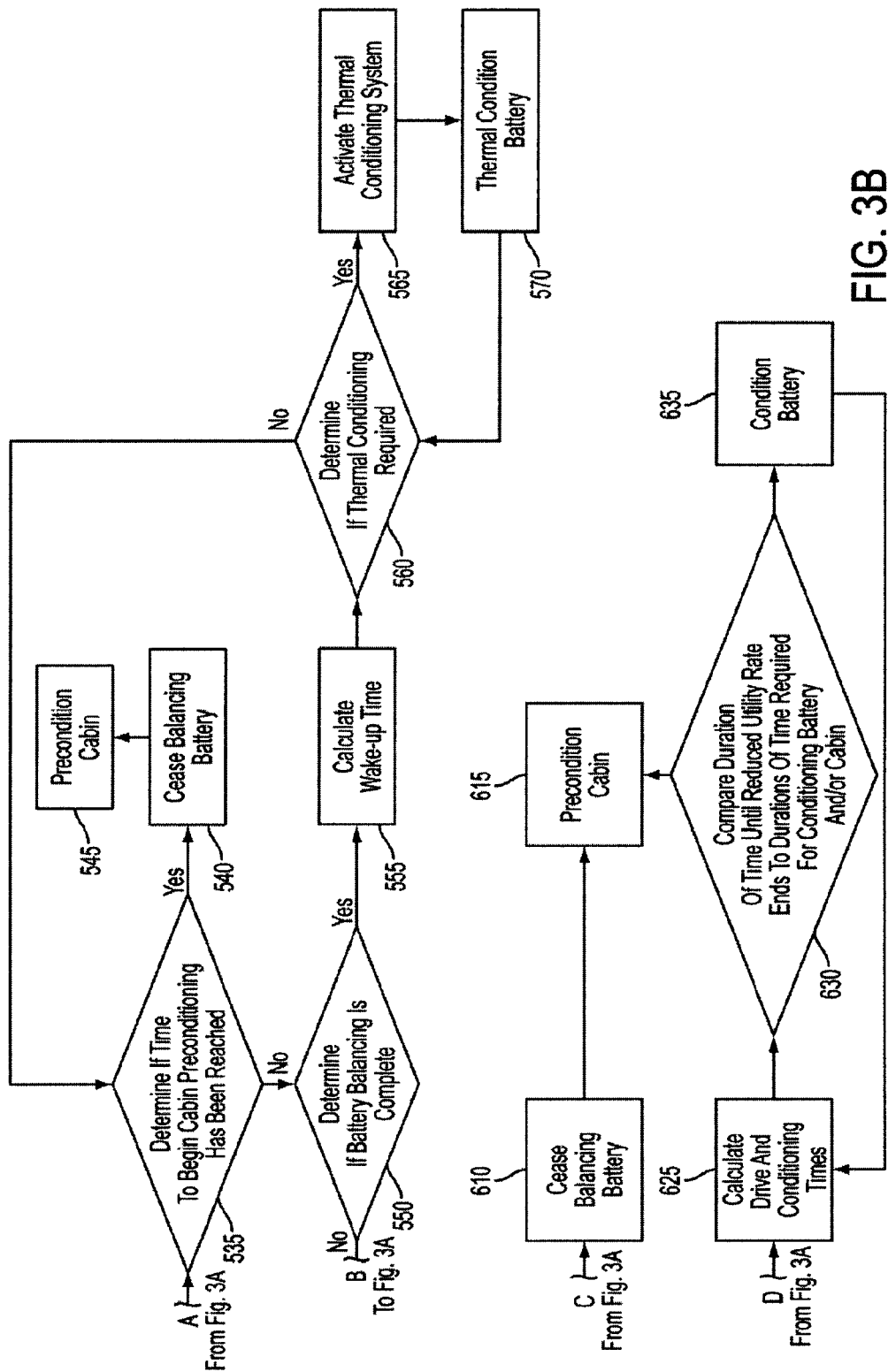

If it was determined at step 160 that a reduced electrical utility rate will be available for some or all of the charging, battery conditioning, battery balancing, or cabin preconditioning times, the method 100 proceeds to step 500 to perform the low cost charging shown in FIGS. 3A and 3B.

At the start of method 500, the system 10 first determines the start ($T_{srr}$) and ending ($T_{err}$) times of the reduced electrical utility rate at step 505. The duration of time from $T_{srr}$ until $T_{err}$ is the reduced electrical utility rate window. In one embodiment, the reduced electrical utility rate window may be a tiered structure with a first electrical utility rate, which is less expensive than the standard electrical utility rate, and a second electrical utility rate, which is less expensive than both the standard electrical utility rate and the first electrical utility rate. If multiple tiers of reduced electrical utility rates are available, the system will calculate start and end times for each tier.

Next, once the system 10 has determined $T_{srr}$ and $T_{err}$, the system 10 determines if $T_{srr}$ is after $T_{sc}$ (at step 510). If the reduced rate window does not begin until after $T_{sc}$, the method 500 goes to step 515. At step 515, the system 10 determines the combination and power input of charging and battery thermal conditioning will take the most efficient advantage of the reduced electrical utility rate. Then, at step 520, the system 10 begins thermal conditioning of the battery and/or charging as determined at step 515. The charging continues until, at step 525, the charging is completed.

Once the charging is completed, the system 10 begins balancing the battery at step 530. While balancing the battery cells, the system 10 determines at step 535 if $T_{cp}$ has been reached. If $T_{cp}$ has been reached, the system 10 ceases balancing the battery at step 540 and begins cabin preconditioning at step 545.

If $T_{cp}$ has not yet been reached, the system 10 determines at step 550 if the battery cell balancing is complete. If balancing is not yet complete, the method 500 returns to step 530, where the system 10 continues to balance the battery. If balancing is complete, the method 500 proceeds to step 555, where the system 10 calculates the wake-up time.

At step 560, the system 10 determines if the battery is within the tolerance of an optimal battery temperature. If the battery is within the tolerance, the method 500 returns to step 535 so the system 10 can determine if $T_{cp}$ has been reached. If, at step 560, the battery temperature is beyond the optimal temperature tolerance, the system 10 activates the thermal conditioning system 30 at step 565 and begins to condition the battery at step 570. This loop continues until the battery is within the tolerance of the optimal battery temperature.

Returning to step 510, if the system 10 determines that the reduced rate window begins before $T_{sc}$, the method 500 proceeds to step 575. At step 575, the system 10 determines if the reduced window duration ($D_{rr}$) is shorter than $D_c$. If $D_{rr}$ is less than $D_c$, the method 500 proceeds to step 580, where the system 10 starts charging immediately and continues until charging is completed at step 525. The method 500 will then proceed to step 530 and the subsequent steps as described above. At some point during the charge, $T_{err}$ will occur and the electrical utility rate will return to the normal rate.

If $D_{rr}$ is determined to be longer than $D_c$ at step 575, the system 10, at step 585, determines the latest time at which the system can begin charging the battery and still complete the charging, conditioning, balancing, and cabin preconditioning before $T_{err}$. In one embodiment, the latest time is the sum of $D_c$, $D_{tc}$, $D_{bb}$, and $D_{cp}$ before $T_{err}$. In another embodiment, the latest time is the longest of $D_c$, $D_{tc}$, $D_{bb}$, and $D_{cp}$ before $T_{err}$ and some or all of charging, battery thermal conditioning, battery balancing, and cabin preconditioning are conducted concurrently.

Next, at step 590, the system 10 beings charging at the latest time at which the system can complete the charging, conditioning, balancing, and cabin preconditioning and still complete these tasks before $T_{err}$. As discussed above, in one embodiment, the latest time is the sum of $D_c$, $D_{tc}$, $D_{bb}$, and $D_{cp}$ before $T_{err}$. In another embodiment, the latest time is the longest of $D_c$, $D_{tc}$, $D_{bb}$, and $D_{cp}$ before $T_{err}$ and some or all of charging, battery thermal conditioning, battery balancing, and cabin preconditioning are conducted concurrently.

Next, at step 595, the system 10 completes the charging and determines if battery balancing is required. If battery balancing is required, the system 10 balances the battery at step 600. If battery balancing is not required, the method 500 continues at step 605. While balancing the battery at step 600, or if it was determined that battery balancing was not required, the system 10 determines if $T_{cp}$ has been reached at step 605. If $T_{cp}$ has been reached, the system 10 stops balancing the battery at step 610 and begins cabin preconditioning at step 615.

If, at step 605, $T_{cp}$ has not been reached, the method 500 continues at step 620, at which point the system 10 determines if battery balancing has completed. If balancing is not complete, the method 500 returns to step 595. If battery balancing is complete, the system 10 recalculates DT, $T_{tc}$, and $T_{cp}$ at step 625, and then compares the amount of time until $T_{err}$ ($D_{err}$) to $D_{cp}$ and $D_{cp}$ at step 630. In one embodiment, if $D_{err}$ is equal to or less than $D_{cp}$, the system 10 begins cabin preconditioning at step 615. If $D_{err}$ is greater than $D_{cp}$, the system 10 wakes up and begins conditioning the battery at step 635. After which the system 10 returns to step 625 (discussed above).

What is claimed is:

1. A control system for controlling vehicle systems, comprising:
    a thermal conditioning system for a battery;
    a vehicle thermal conditioning system; and
    a control unit configured to accept external inputs and configured to control a charging system for the battery, the thermal conditioning system for the battery, and the vehicle thermal conditioning system;
    wherein the control unit determines if a battery temperature is beyond a tolerance of an optimal battery temperature and activates the battery thermal conditioning system to bring the battery within the tolerance of the optimal battery temperature.

2. The control system of claim 1, wherein the control unit determines a first duration of time until a preset drive time and a second duration of time required to bring the battery within the tolerance of the optimal battery temperature and activates the battery thermal conditioning system when the first duration equals the second duration.

3. The control system of claim 1, wherein the control unit:
    calculates a first duration of time until a preset drive time and a second duration of time required to charge the battery, if the second duration is less than or equal to the first duration, begins charging the battery, and if the second duration is greater than the first duration, recalculates the first duration and the second duration.

4. The control system of claim 1, wherein the control unit:
    determines a first duration of time until a preset drive time, a second duration of time required to charge the battery, and a third duration of time required to balance the battery;
    begins charging the battery when the first duration equals the sum of the second and third durations; and
    begins balancing the battery when the first duration equals the third duration.

5. The control system of claim 1, wherein the control unit determines a first time at which a reduced electrical utility rate is available and begins charging the battery at the first time.

6. The control system of claim 1, wherein the control unit enables a preset number of vehicle cabin conditioning events to thermally condition a vehicle cabin.

7. The control system of claim 6, wherein the control unit:
    calculates a first duration of time until a preset drive time, a second duration of time required to thermally condition the vehicle cabin to reach a preset cabin temperature, and a number of vehicle cabin conditioning events required to thermally condition the vehicle cabin to reach the preset cabin temperature;
    if the number of vehicle cabin conditioning events required is less than or equal to the number of vehicle cabin conditioning events enabled and the first duration of time is equal to or less than the second duration of time, begins conditioning the cabin; and
    if the number of vehicle cabin conditioning events required is greater than the number of vehicle cabin conditioning events enabled or the first duration of time is greater than the second duration of time, recalculates the first duration of time until a preset drive time, the second duration of time required to thermally condition the vehicle cabin to reach a preset cabin temperature, and the number of vehicle cabin conditioning events required to thermally condition the vehicle cabin to reach the preset cabin temperature.

8. The control system of claim 1, wherein the control unit determines:
   a first duration of time until a preset drive time;
   a second duration of time required to charge the battery
   a third duration of time required to thermally condition the battery;
   a fourth duration of time required to balance the battery; and
   a fifth duration of time required to thermally condition a vehicle cabin; and
   begins to charge the battery when the first duration equals the sum of the second, third, fourth, and fifth durations.

9. The control system of claim 1, wherein the tolerance comprises an upper bounds and a lower bounds and the thermal conditioning system for the battery increases a temperature of the battery if the temperature of the battery is below the lower bounds and decreases a temperature of the battery if the temperature of the battery is above the upper bounds.

10. A method of controlling vehicle systems comprising:
    determining a first duration of time until a predetermined drive time, utilizing a control unit;
    determining a second duration of time required to charge a battery, utilizing the control unit;
    determining a first time to start charging the battery based on the first duration of time and the second duration of time, utilizing the control unit;
    charging the battery at the first time, utilizing a battery charging system;
    monitoring a temperature of the battery;
    cooling the battery if the temperature of the battery increases above a preset tolerance; and
    heating the battery if the temperature of the battery decreases below the preset tolerance.

11. The method of claim 10, further comprising:
    determining a third duration of time required to thermally condition the battery, utilizing the control unit;
    determining the first time based on the first duration of time, the second duration of time, and the third duration of time, utilizing the control unit;
    determining a second time based on the third duration of time, utilizing the control unit; and
    thermally conditioning the battery at the second time, utilizing a thermal conditioning system.

12. The method of claim 10, further comprising:
    determining a third duration of time required to balance charge among battery cells, utilizing the control unit;
    determining the first time based on the first duration of time, the second duration of time, and the third duration of time, utilizing the control unit;
    determining a second time based on the third duration of time and the first duration of time, utilizing the control unit; and
    balancing the charge among battery cells at the second time, utilizing the battery charging system.

13. The method of claim 10, further comprising:
    determining a third duration of time required to thermally condition a vehicle cabin to a preset cabin temperature, utilizing the control unit;
    determining the first time based on the first duration of time, the second duration of time, and the third duration of time, utilizing the control unit;
    determining a second time based on the third duration of time and the first duration of time, utilizing the control unit; and
    thermally conditioning the vehicle cabin at the second time, utilizing a vehicle cabin conditioning system.

14. The method of claim 13, further comprising:
    enabling a preset first number of cabin preconditioning events, utilizing the control unit;
    determining a second number of cabin preconditioning events required to thermally condition the vehicle cabin to the preset cabin temperature, utilizing the control unit;
    if the second number is greater than the first number, determining a fourth duration equal to the duration of time to execute the preset first number of cabin preconditioning events, utilizing the control unit; and
    further determining the second time based on the fourth duration of time, utilizing the control unit.

15. The method of claim 10, further comprising:
    determining a third duration of time required to thermally condition the battery, utilizing the control unit;
    determining a fourth duration of time required to balance charge among battery cells, utilizing the control unit;
    determining a fifth duration of time required to thermally condition a vehicle cabin to a preset cabin temperature, utilizing the control unit;
    determining the first time based on the first duration of time, the second duration of time, third duration of time, fourth duration of time, and fifth duration of time, utilizing the control unit;
    determining a second time based on the first duration of time, third duration of time, fourth duration of time, and fifth duration of time, utilizing the control unit;
    determining a third time based on the first duration of time, fourth duration of time and the fifth duration of time, utilizing the control unit;
    determining a fourth time based on the first duration of time and the fifth duration of time, utilizing the control unit;
    thermally conditioning the battery at the second time, utilizing a thermal conditioning system;
    balancing the charge among battery cells at the third time, utilizing the battery charging system; and
    thermally conditioning the vehicle cabin to the preset temperature at the fourth time, utilizing a vehicle cabin conditioning system.

16. The method of claim 15, wherein:
    the first time occurs when the first duration of time equals the sum of the second duration of time, third duration of time, fourth duration of time, and fifth duration of time;
    the second time occurs when the first duration of time equals the sum of the third duration of time, the fourth duration of time, and the fifth duration of time;
    the third time occurs when the first duration of time equals the sum of the fourth duration of time and the fifth duration of time; and
    the fourth time occurs when the first duration of time equals the fifth duration of time.

17. The method of claim 15, wherein:
    the charging the battery step, thermally conditioning the battery step, balancing the battery charge step, and thermally conditioning the vehicle cabin step occur concurrently for at least a portion of time.

18. The method of claim 10, further comprising:
    determining a third duration of time during which a reduced electrical utility rate is available, utilizing the control unit;
    determining if the first duration of time is greater than the second duration of time, utilizing the control unit; and
    if the first duration of time is greater than the second duration of time, setting the first time, utilizing the control unit such that the battery will be fully charged at an end of the third duration of time.

19. The method of claim 10, wherein the first time occurs when the first duration equals the second duration.

* * * * *